United States Patent
Lee et al.

(10) Patent No.: US 10,595,264 B2
(45) Date of Patent: Mar. 17, 2020

(54) METHOD AND APPARATUS FOR PERFORMING APPLICATION SPECIFIC ACCESS CONTROL IN WIRELESS COMMUNICATION SYSTEM

(71) Applicant: LG ELECTRONICS INC., Seoul (KR)

(72) Inventors: Youngdae Lee, Seoul (KR); Jaehyun Kim, Seoul (KR); Sunghoon Jung, Seoul (KR); Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 15/323,299

(22) PCT Filed: Jul. 9, 2015

(86) PCT No.: PCT/KR2015/007129
§ 371 (c)(1),
(2) Date: Dec. 30, 2016

(87) PCT Pub. No.: WO2016/006948
PCT Pub. Date: Jan. 14, 2016

(65) Prior Publication Data
US 2018/0109992 A1   Apr. 19, 2018

Related U.S. Application Data

(60) Provisional application No. 62/022,200, filed on Jul. 9, 2014.

(51) Int. Cl.
*H04W 48/06* (2009.01)
*H04W 4/10* (2009.01)
(Continued)

(52) U.S. Cl.
CPC ......... *H04W 48/06* (2013.01); *H04L 65/4061* (2013.01); *H04W 4/10* (2013.01);
(Continued)

(58) Field of Classification Search
CPC . H04W 72/04; H04W 74/00; H04W 28/0268; H04W 28/0289; H04W 48/06;
(Continued)

(56) References Cited

U.S. PATENT DOCUMENTS

2012/0106458 A1* 5/2012 Jang .................. H04W 76/027
370/328
2014/0010180 A1* 1/2014 Lee ...................... H04W 72/04
370/329
(Continued)

FOREIGN PATENT DOCUMENTS

CN   1870597 A   11/2006
CN   103299700 A   9/2013
(Continued)

OTHER PUBLICATIONS

3GPP, TS GSSA, Service Accessiblity, TS 22.011 v13.0.0, Jun. 2014 (Year: 2014).*
(Continued)

*Primary Examiner* — Robert C Scheibel
(74) *Attorney, Agent, or Firm* — Birch, Stewart, Kolasch & Birch, LLP (57) ABSTRACT

A method and apparatus for performing application specific access control in a wireless communication system is provided. A user equipment (UE) receives access control related system information from a network, identifies initiation of a specific application, and determines whether or not access attempt for the specific application is allowed, based on the received access control related system information. Accordingly, the UE may determine whether or not to skip access
(Continued)

control barring (ACB) check for the specific application, or whether or not to skip random access backoff for the specific application.

5 Claims, 6 Drawing Sheets

(51) Int. Cl.
H04W 28/02 (2009.01)
H04W 12/08 (2009.01)
H04W 4/90 (2018.01)
H04L 29/06 (2006.01)
H04W 48/12 (2009.01)

(52) U.S. Cl.
CPC ............. *H04W 4/90* (2018.02); *H04W 12/08* (2013.01); *H04W 28/0268* (2013.01); *H04W 28/0289* (2013.01); *H04W 48/12* (2013.01)

(58) Field of Classification Search
CPC ........... H04W 4/90; H04W 4/10; H04W 4/22; H04W 12/08; H04W 48/12; H04L 65/4061
See application file for complete search history.

(56) References Cited

U.S. PATENT DOCUMENTS

| 2014/0066082 A1* | 3/2014 | Anchan | H04M 3/00 |
| | | | 455/452.1 |
| 2015/0223146 A1* | 8/2015 | Pinheiro | H04W 4/14 |
| | | | 370/230 |
| 2016/0212653 A1* | 7/2016 | Wang | A61B 10/0051 |

FOREIGN PATENT DOCUMENTS

| EP | 2876938 A1 | 5/2015 |
| EP | 2988552 A1 | 2/2016 |
| WO | WO 2013/141600 A1 | 9/2013 |
| WO | WO 2014/003122 A1 | 1/2014 |
| WO | WO 2014/014056 A1 | 1/2014 |
| WO | WO 2014/042462 A1 | 3/2014 |

OTHER PUBLICATIONS

3GPP, "3rd Generation Partnership Project; Technical Specification Group Services and System Aspects; Study on Application-Specific Congestion Control for Data Communication (Release 13)," 3GPP TR 22.806, V13.0.0, Jun. 2014, pp. 1-40.

3GPP TS 22.011 V13.0.0; Jun. 2014, 3rd Generation Partnership Project; Technical Specification Group Services and System Aspects; Service accessibility (Release 13); pp. 1-27.

3GPP TS 22.179 V0.4.0, May 2014, 3rd Generation Partnership Project; Technical Specification Group Services and System Aspects; Mission Critical Push to Talk MCPTT; (Release 13), 26 Pages.

3GPP TS 24.173 V11.2.0, Mar. 2012, 3rd Generation Partnership Project; Technical Specification Group Core Network and Terminals; IMS multimedia telephony communication service and supplementary services; Stage 3 (Release 11), pp. 1-17.

3GPP TS 36.321 V12.2.0, Jun. 2014, 3rd Generation Partnership Project; Technical Specification Group Radio Access Network; Evolved Universal Terrestrial Radio Access (E-UTRA); Medium Access Control (MAC) protocol specification (Release 12), pp. 1-57.

3GPP TS 36.331 V11.0.0, Jun. 2012, 3rd Generation Partnership Project; Technical Specification Group Radio Access Network; Evolved Universal Terrestrial Radio Access (E-UTRA); Radio Resource Control (RRC); Protocol specification (Release 11), pp. 1-302.

Samsung, "Skipping ACB check for MMTEL-voice/video and SMS", R2-142290, 3GPP TSG RAN WG2 #86, May 9-May 23, 2014, Seoul, Korea, 7 Pages (http://www.3gpp.org/ftp/tsg_ran/WG2_RL2/TSGR2_86/docs/), See p. 1.

Huawei et al., "Discussion on ACB Skip Mechanism for IMS Services and SMS," 3GPP TSG CT QG1 Meeting #86bis, C1-141077, Dubrovnik, Croatia, Mar. 31-Apr. 4, 2014, 6 pages.

* cited by examiner

METHOD AND APPARATUS FOR PERFORMING APPLICATION SPECIFIC ACCESS CONTROL IN WIRELESS COMMUNICATION SYSTEM

CROSS REFERENCE TO RELATED APPLICATIONS:

This application is the National Phase of PCT International Application No. PCT/KR2015/007129, filed on Jul. 9, 2015, which claims priority under 35 U.S.C. 119(e) to U.S. Provisional Application No. 62/022,200, filed on Jul. 9, 2014, all of which are hereby expressly incorporated by reference into the present application.

TECHNICAL FIELD

The present invention relates to wireless communications, and more particularly, to a method and apparatus for performing an application specific access control for public safety and/or mission critical push to talk (MCPTT) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power con-sumption of a terminal as an upper-level requirement.

Recently, there has been an interest to ensure that the public has the capability to receive timely and accurate alerts, warnings and critical information regarding disasters and other emergencies irrespective of what communications technologies they use. As has been learned from disasters such as earthquakes, tsunamis, hurricanes and wild fires, such a capability is essential to enable the public to take appropriate action to protect their families and themselves from serious injury, or loss of life or property. This interest to enhance the reliability, resiliency, and security of warning notifications to the public by providing a mechanism to distribute warning notifications over 3GPP systems is the impetus for a public warning system (PWS).

Under certain circumstances, it will be desirable to prevent user equipment (UE) users from making access attempts (including emergency call attempts) or responding to pages in specified areas of a public land mobile network (PLMN). Such situations may arise during states of emergency, or where 1 of 2 or more co-located PLMNs has failed. Broadcast messages should be available on a cell by cell basis indicating the class(es) or categories of subscribers barred from network access. The use of these fa-cilities allows the network operator to prevent overload of the access channel under critical conditions. It is not intended that access control be used under normal operating conditions. It should be possible to differentiate access control between circuit-switched (CS) and packet-switched (PS) domains.

Various access control schemes may be defined in 3GPP LTE, which may include access class barring (ACB), extended access barring (EAB), service specific access control (SSAC), and application specific congestion control for data communication (ACDC). A method for performing access control for public safety and/or mission critical push to talk (MCPTT) may be required.

DISCLOSURE OF INVENTION

Technical Problem

The present invention provides a method and apparatus for performing an application specific access control for public safety and/or mission critical push to talk (MCPTT) in a wireless communication system. The present invention provides a method and apparatus for controlling access attempts public safety applications. The present invention provides a method and apparatus for determining whether access attempt for a specific application is allowed or not based on access control related system information.

Solution to Problem

In an aspect, a method for performing, by a user equipment (UE), application specific access control in a wireless communication system is provided. The method includes receiving access control related system information from a network, identifying initiation of a specific application, and determining whether or not access attempt for the specific application is allowed, based on the received access control related system information.

In another aspect, a user equipment (UE) includes a memory, a transceiver, and a processor coupled to the memory and the transceiver, and configured to control the transceiver to receive access control related system information from a network, identify initiation of a specific application, and determine whether or not access attempt for the specific application is allowed, based on the received access control related system information.

Advantageous Effects of Invention

Application specific access control can be performed efficiently.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

Figure 1:
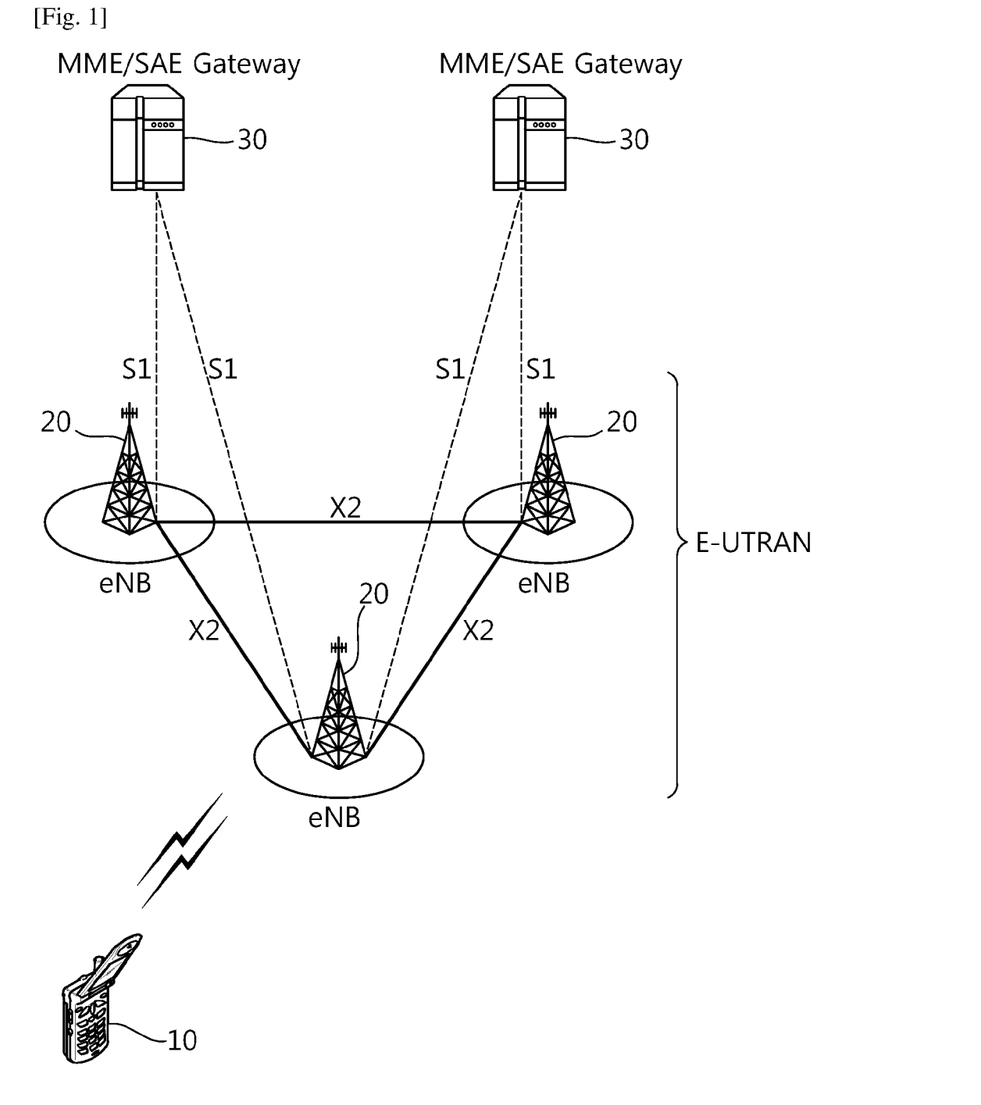
FIG. 1 shows LTE system architecture.

FIG. 1 shows LTE system architecture. The communication network is widely deployed to provide a variety of communication services such as voice over internet protocol (VoIP) through Internet protocol (IP) multimedia subsystem (IMS) and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that com-municates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
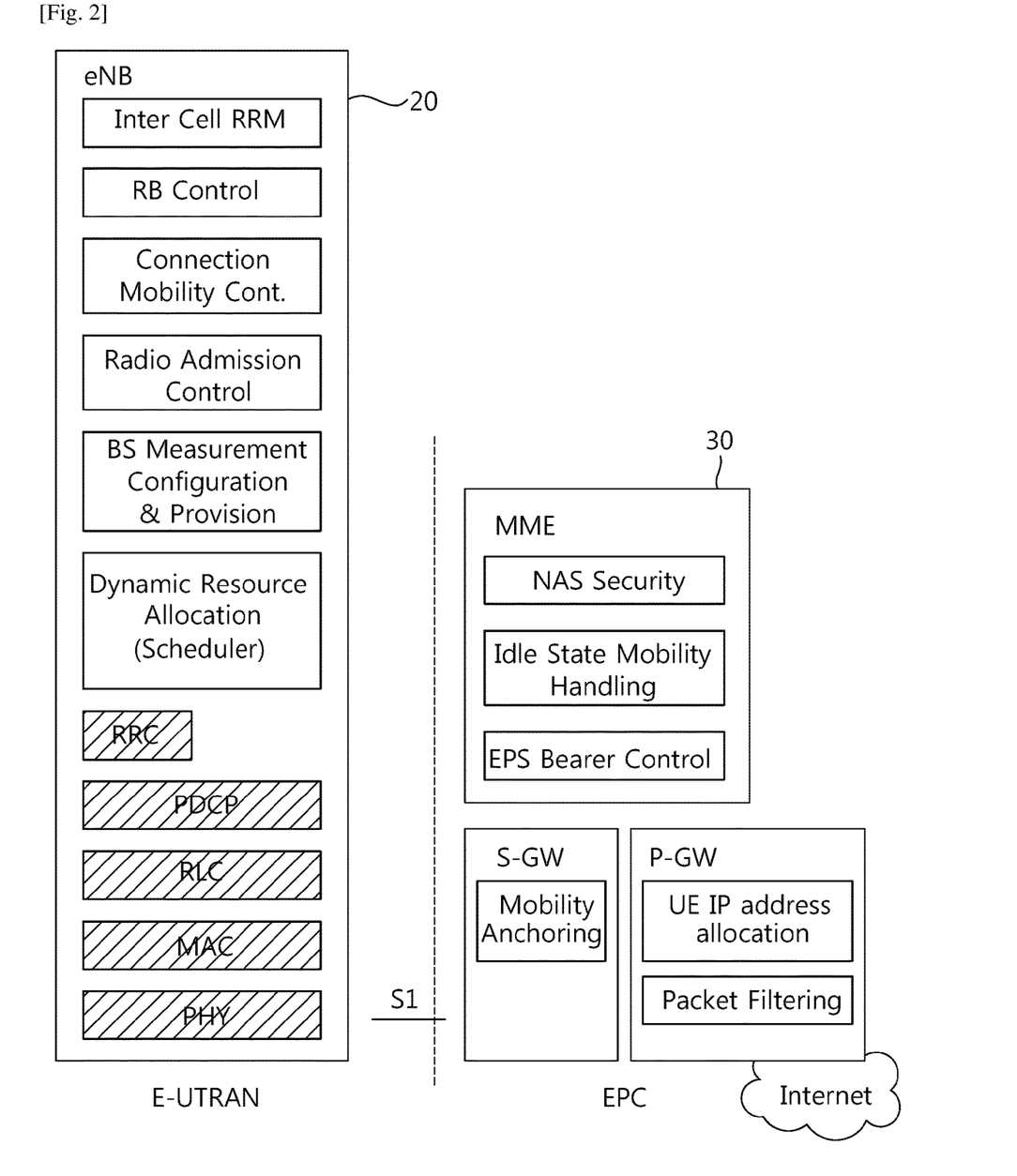
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
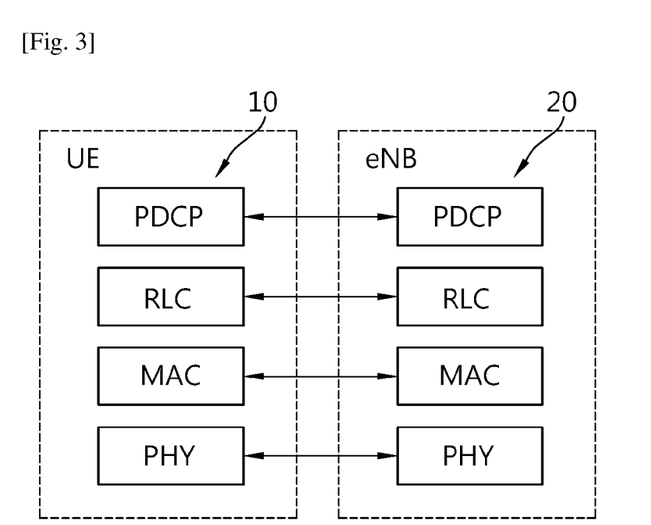
FIG. 3 shows a block diagram of a user plane protocol stack of an LTE system.
Figure 4:
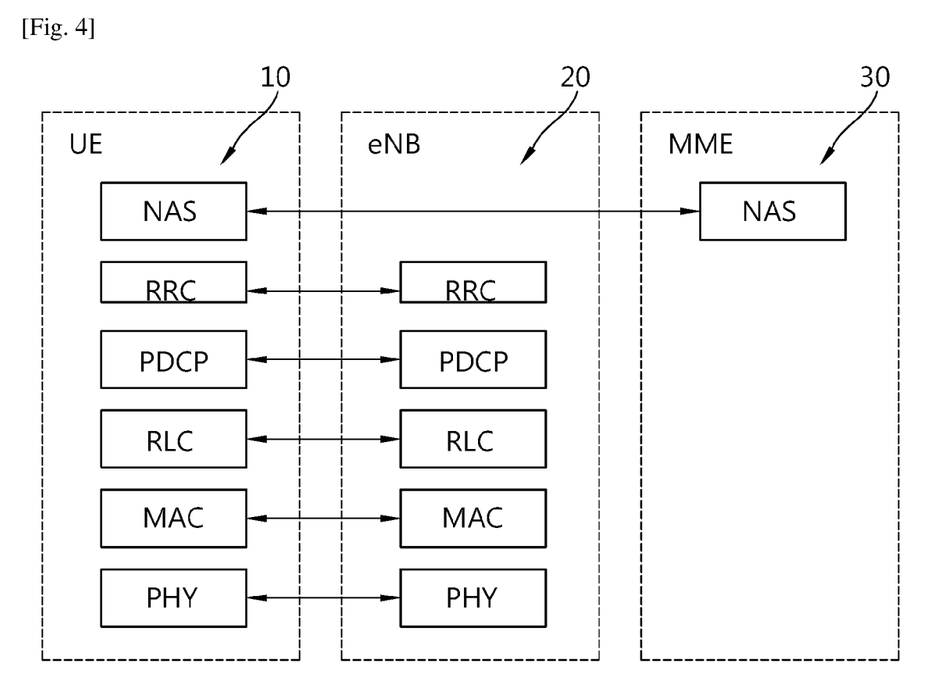
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
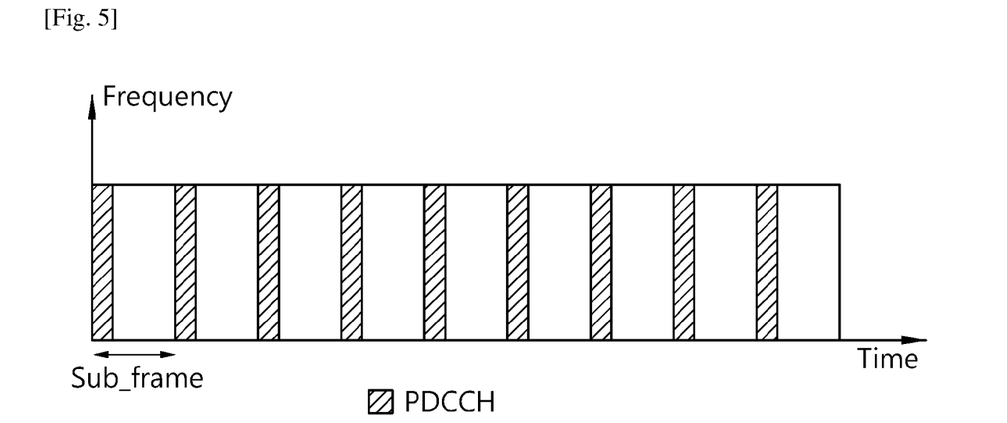
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Access class barring (ACB) check is described. It may be referred to Section 5.3.3.11 of 3GPP TS 36.331 V11.0.0 (2012-06) and/or Section 4.3.1 of 3GPP TS 22.011 V13.0.0 (2014-06). If the UE is a member of at least one access class which corresponds to the permitted classes as signaled over the air interface, and the access class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Also, the serving network can indicate that UEs are restricted to perform location registration, although common access is permitted. If the UE responded to paging it shall follow the normal defined procedures and react as specified to any network command.

1> if timer T302 or "Tbarring" is running:
2> consider access to the cell as barred;
1> else if SystemInformationBlockType2 includes "AC barring parameter":
2> if the UE has one or more ACs, as stored on the USIM, with a value in the range 11 . . . 15, which is valid for the UE to use (ACs 12, 13, 14 are only valid for use in the home country and ACs 11, 15 are only valid for use in the HPLMN/EHPLMN), and
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0<rand<1;
2> start timer "Tbarring" with the timer value calculated as follows, using the ac-BarringTime included in "AC barring parameter":
"Tbarring"=(0.7+0.6*rand)*ac-BarringTime.

Service specific access control (SSAC) in multimedia telephony (MMTEL) layer is described. It may be referred to Annex J.2.1.1 of 3GPP TS 24.173 V11.2.0 (2012 March). The following information is provided by lower layer:

BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish a MMTEL communication session, the UE shall:
1> if the MMTEL communication session to be established is an emergency session, then skip the rest of steps below and continue with session establishment;
2> retrieve SSAC related information mentioned above from lower layers;
3> if video is offered in the multimedia telephony communication session:
A> if back-off timer Tx is running, reject the MMTEL communication session establishment and skip the rest of steps below; or
B> else, then:
I> draw a new random number "rand1" that is uniformly distributed in the range 0<rand1<1; and
II> if the random number "rand1" is lower than BarringFactorForMMTEL-Video, then skip the rest of steps below and continue with session establishment;
III> else, then;
i> draw a new random number "rand2" that is uniformly distributed in the range 0<rand2<1; and
ii> start back-off timer Tx with the timer value calculated using the formula:
Tx=(0.7+0.6*rand2) BarringTimeForMMTEL-Video; and
iii> reject the multimedia telephony communication session establishment and skip the rest of steps below;
4> if audio is offered in the MMTEL communication session:
A> if back-off timer Ty is running, reject the MMTEL communication session establishment and skip the rest of steps below; or
B> else, then;
I> draw a new random number "rand3" that is uniformly distributed in the range 0<rand3<1; and
II> if the random number "rand3" is lower than BarringFactorForMMTEL-Voice, then skip the rest of steps below and continue with session establishment;
III> else, then;
i> draw a new random number "rand4" that is uniformly distributed in the range 0<rand4<1; and
ii> start timer Ty with the timer value calculated using the formula:
Ty=(0.7+0.6*rand4)*BarringTimeForMMTEL-Voice; and
iii> reject the multimedia telephony communication session establishment;

If the MMTEL communication implementation and the access stratum protocol implementation are located in separate physical entities, it is expected that the inter-connecting protocol supports the transfer of information elements needed for the SSAC enforcement.

SSAC is not activated when the UE is in other radio accesses (e.g., UTRAN/GERAN). And when the UE camping on E-UTRAN moves to other radio accesses (e.g., UTRAN/GERAN), back-off timer (Tx or Ty or both) shall be stopped if running.

Handling of SSAC related parameters is described. It may be referred to Section 5.3.3.10 of 3GPP TS 36.331 V11.0.0 (2012 June). Upon request from the upper layers, the UE shall:
1> set the local variables BarringFactorForMMTEL-Voice and BarringTime-ForMMTEL-Voice as follows:
2> if the UE is in RRC_IDLE and ssac-BarringForMMTEL-Voice is present:
3> if the UE has one or more access classes (ACs), as stored on the universal subscriber identification module (USIM), with a value in the range 11 . . . 15, which is valid for the UE to use (ACs 12, 13, 14 are only valid for use in the home country and ACs 11, 15 are only valid for use in the home PLMN (HPLMN)/equivalent HPLMN (EHPLMN)), and 3> if, for at least one of these access classes, the corresponding bit in the ac-Barring-ForSpecialAC contained in ssac-BarringForMMTEL-Voice is set to zero:
4> set BarringFactorForMMTEL-Voice to one and BarringTimeForMMTEL-Voice to zero;
3> else:
4> set BarringFactorForMMTEL-Voice and BarringTimeForMMTEL-Voice to the value of ac-BarringFactor and ac-BarringTime included in ssac-BarringForMMTEL-Voice, respectively;
2> else set BarringFactorForMMTEL-Voice to one and BarringTimeForMMTEL-Voice to zero;
1> set the local variables BarringFactorForMMTEL-Video and BarringTime-ForMMTEL-Video as follows:
2> if the UE is in RRC_IDLE and ssac-BarringForMMTEL-Video is present:
3> if the UE has one or more access classes, as stored on the USIM, with a value in the range 11 . . . 15, which is valid for the UE to use, and
3> if, for at least one of these access classes, the corresponding bit in the ac-Barring-ForSpecialAC contained in ssac-BarringForMMTEL-Video is set to zero:
4> set BarringFactorForMMTEL-Video to one and BarringTimeForMMTEL-Video to zero;
3> else:
4> set BarringFactorForMMTEL-Video and BarringTimeForMMTEL-Video to the value of ac-BarringFactor and ac-BarringTime included in ssac-BarringForMMTEL-Video, respectively;
2> else set BarringFactorForMMTEL-Video to one and BarringTimeForMMTEL-Video to zero;
1> forward the variables BarringFactorForMMTEL-Voice, BarringTime-ForMMTEL-Voice, BarringFactorForMMTEL-Video and BarringTimeForMMTEL-Video to the upper layers;

The SystemInformationBlockType2 information element (IE) (hereinafter, SIB2) contains radio resource configuration information that is common for all UEs. Table 1 shows an example of the SIB2. The SIB2 includes parameters for the ACB and SSAC described above.

TABLE 1

-- ASN1STARTSystemInformationBlockType2 ::= SEQUENCE {ac-BarringInfo SEQUENCE {ac-BarringForEmergency BOOLEAN,ac-BarringForMO-Signalling AC-BarringConfig OPTIONAL, -- Need OPac-BarringForMO-Data AC-BarringConfig OPTIONAL -- Need OP} OPTIONAL, -- Need OPradioResourceConfigCommon RadioResourceConfigCommonSIB,ue-TimersAndConstants UE-TimersAndConstants,freqInfo SEQUENCE {ul-CarrierFreq ARFCN-ValueEUTRA OPTIONAL, -- Need OPul-Bandwidth ENUMERATED {n6, n15, n25, n50, n75, n100}OPTIONAL, -- Need OPadditionalSpectrumEmission AdditionalSpectrumEmission}, mbsfn-SubframeConfigList MBSFN-SubframeConfigList OPTIONAL, -- Need ORtimeAlignmentTimerCommon TimeAlignmentTimer,...,lateNonCriticalExtension OCTET STRING (CONTAINING SystemInformationBlockType2-v8h0-IEs)OPTIONAL, -- Need OP[[ ssac-BarringForMMTEL-Voice-r9 AC-BarringConfig OPTIONAL, -- Need OPssac-BarringForMMTEL-Video-r9 AC-BarringConfig OPTIONAL -- Need OP]],[[ ac-BarringForCSFB-r10 AC-BarringConfig OPTIONAL -- Need OP]]}
SystemInformationBlockType2-v8h0-IEs ::= SEQUENCE {multiBandInfoList SEQUENCE (SIZE (1..maxMultiBands)) OF AdditionalSpectrumEmissionOPTIONAL, -- Need ORnonCritical-Extension SystemInformation-BlockType2-v9e0-IEs OPTIONAL -- Need OP}SystemInformationBlockType2-v9e0-IEs ::= SEQUENCE {ul-CarrierFreq-v9e0 ARFCN-ValueEUTRA-v9e0 OPTIONAL, -- Cond ul-FreqMaxnonCriticalExtension SEQUENCE { } OPTIONAL -- Need OP}AC-BarringConfig ::= SEQUENCE {ac-BarringFactor ENUMERATED {p00, p05, p10, p15, p20, p25, p30, p40,p50, p60, p70, p75, p80, p85, p90, p95},ac-BarringTime ENUMERATED {s4, s8, s16, s32, s64, s128, s256, s512}, TABLE 1-continued ac-BarringForSpecialAC BIT STRING (SIZE(5))}MBSFN-SubframeConfigList ::=SEQUENCE (SIZE (1..maxMBSFN-Allocations)) OF MBSFN-SubframeConfig-- ASN1STOP Referring to Table 1, the ac-BarringFactor field indicates a referece for ACB. If the random number drawn by the UE is lower than this value, access is allowed. Otherwise the access is barred. The ac-BarringForCSFB field indicatates ACB for mobile originating (MO) circuit-switch (CS) fallback. The ac-B arringForEmergency field indicates ACB for AC 10. The ac-BarringForMO-Data field indicates ACB for MO calls. The ac-BarringForMO-Signalling field indicates ACB for MO signaling. The ac-BarringForSpecialAC field indicates ACB for AC 11-15. The first/leftmost bit is for AC 11, the second bit is for AC 12, and so on. The ac-BarringTime field indicates access barring time value in seconds. The ssac-BarringForMMTEL-Video field indicates SSAC for MMTEL video originating calls. The ssac-BarringForMMTEL-Voice field indicates SSAC for MMTEL voice originating calls.

Additionally, the SIB2 may further include 3 bits of ACB skip bits. The first bit of the ACB skip bits may indicate whether or not to skip ACB in case that MMTEL voice call is initiated from the UE. The second bit of the ACB skip bits may indicate whether or not to skip ACB in case that MMTEL video call is initiated from the UE. The third bit of the ACB skip bits may indicate whether or not to skip ACB in case that short message service (SMS) is initiated from the UE. More specifically, if the network indicates that ACB is skipped for MMTEL voice, the RRC layer of the UE may skip ACB check before sending the RRC connection request message to the network, upon receiving the service request message for MO MMTEL voice from the NAS layer of the UE. If the network indicates that ACB is skipped for MMTEL video, the RRC layer of the UE may skip ACB check before sending the RRC connection request message, upon receiving the service request message for MO MMTEL video from the NAS layer of the UE. If the network indicates that ACB is skipped for SMS, the RRC layer of the UE may skip ACB check before sending the RRC connection request message, upon receiving the service request message for MO SMS from the NAS layer of the UE.

Application specific congestion control for data communication (ACDC) is described. ACDC is an access control mechanism for the operator to allow/prevent new access attempts from particular, operator-identified applications in the UE. The network may prevent/mitigate overload of the access network and/or the core network. This feature is optional. For ACDC, the following requirements may apply:

This feature shall be applicable to UTRAN and E-UTRAN.
This feature shall be applicable to UEs that are not a member of one or more of access classes 11 to 15.
The home network shall be able to configure a UE with multiple ACDC categories to each of which particular, operator-identified applications are associated. The categories shall be ranked in order of importance.
The serving network shall be able to broadcast, in one or more areas of the RAN, control information per each ACDC category, indicating, e.g. barring rates, and whether a roaming UE shall be subject to ACDC control.
The UE shall be able to control whether or not access attempt for certain application is allowed, based on this broadcast control information and the configuration of categories in the UE.

The serving network shall be able to simultaneously indicate ACDC with other forms of access control.

When both ACDC and ACB controls are indicated, ACDC shall override ACB.

In the case of multiple core networks sharing the same access network, the access network shall be able to apply ACDC for the different core networks individually. For the mitigation of congestion in a shared RAN, barring rates should be set equal for all participating operators.

Random access backoff is described. It may be referred to Section 5.1.4 of 3GPP TS 36.321 V12.2.0 (2014 June). At first, the backoff parameter in the UE is set to 0 ms. If the random access response contains a backoff indicator subheader, the backoff parameter value in the UE is set as indicated by the BI field of the backoff indicator subheader and backoff parameter values shows in Table 1 below. Else, the backoff parameter value in the UE is set to 0 ms.

TABLE 2

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

If in this random access procedure, the random access preamble was selected by MAC based on the backoff parameter in the UE, a random backoff time according to a uniform distribution between 0 and the backoff parameter value is selected. Accordingly, the subsequent random access transmission is delayed by the backoff time.

Currently, according to the prior art, the RRC layer of the UE cannot recognize MO MMTEL voice/video and MO SMS, when it receives the service request message from the NAS layer of the UE. Accordingly, for applying ACDC for public safety and/or mission critical push to talk (MCPTT), a problem may occur.

In order to solve the problem described above, a method for controlling access attempts for public safety applications according to an embodiment of the present invention is described below.

Figure 6:
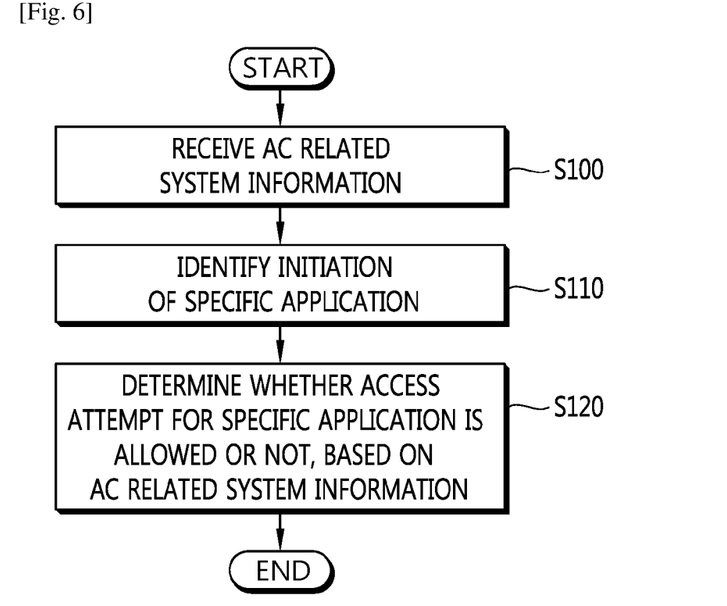
FIG. 6 shows an example of a method for performing application specific access control according to an embodiment of the present invention.

FIG. 6 shows an example of a method for performing application specific access control according to an embodiment of the present invention.

In step S100, the UE receives access control related system information from a network. The access control related system information may include mapping between at least one application and at least one category. The UE may be configured with at least one category for public safety applications. The at least one category may be associated with at least one public safety applications. The public safety application may include MCPTT application. Or, the at least one category may be associated with at least one group communication. In this case, members of a group communication (e.g. users of a group call) may communicate through a MCPTT application. The at least one category may correspond to ACDC category. The at least one category may be ranked in order of priority. The priority may correspond to one of group call priority, MCPTT (application) priority, per packet priority (PPP), a priority of a member within a group call, proximity services (ProSe) application priority, allocation and retention priority, quality of service (QoS) class indicator (QCI), logical channel priority, and any priority used in 3GPP LTE. If there are at least one category associated with non-public safety applications and at least one category associated with public safety applications, the category associated with public safety applications may have a higher priority than all categories associated with non-public safety applications.

The access control related system information may indicate barring information (e.g. barring time and barring factor) per each category. Further, the access control related system information may indicate at least one of whether or not to skip ACB check, whether or not to skip the random access backoff, or whether a roaming UE shall apply this access control related system information, per each category. Alternatively, the access control related system information may be provided for all categories associated with public safety applications or MCPTT calls. The access control related system information either indicating whether or not to skip ACB check, whether or not to skip the random access backoff may be broadcast for all categories at a serving cell.

If the RRC layer of the UE receives the access control related system information, the RRC layer of the UE may forward the access control related system information to an upper layer, such as NAS layer or application layer.

In step S110, the UE identifies initiation of a specific application. Specifically, the NAS or RRC layer of the UE may identify the initiation of the specific application by receiving indication of beginning of the specific application from an upper layer, i.e. application layer.

In step S120, the UE determines whether or not access attempt for the initiated application is allowed, based on the received access control related system information and/or and the configuration of categories in the UE. The UE may determine whether or not to skip ACB check in the NAS or RRC layer of the UE, based on the received access control related system information and/or the configuration of categories in the UE. If the application layer of the UE determines whether or not to skip ACB check in the NAS or RRC layer of the UE, the application layer of the UE may indicate to the NAS or RRC layer of the UE whether or not to skip ACB check in the UE (and/or initiation of the application). Then, the NAS or RRC layer of the UE may determine whether or not to skip ACB accordingly. If the NAS layer of the UE determines whether or not to skip ACB check in the RRC layer of the UE, the NAS layer of the UE may indicate to the RRC layer of the UE whether or not to skip ACB check in the UE (and/or initiation of the application). Then, the RRC layer of the UE may determine whether or not to skip ACB accordingly.

Further, the UE may determine whether or not to skip the random access backoff in the MAC layer of the UE, based on the received access control related system information and/or the configuration of categories in the UE. If the application layer of the UE determines whether or not to skip the random access backoff, the application layer of the UE may indicate to the AS layer of the UE whether or not to skip the random access backoff in UE (and/or initiation of the application). Then, the MAC layer of the UE may determine whether or not to skip the random access backoff accordingly. If the NAS layer of the UE determines whether or not to skip the random access backoff in the AS layer of the UE, the NAS layer of the UE may indicate to the AS layer of the UE whether or not to skip the random access backoff in the UE (and/or initiation of the application). Then, the MAC layer of the UE may determine whether or not to skip the random access backoff accordingly.

Figure 7:
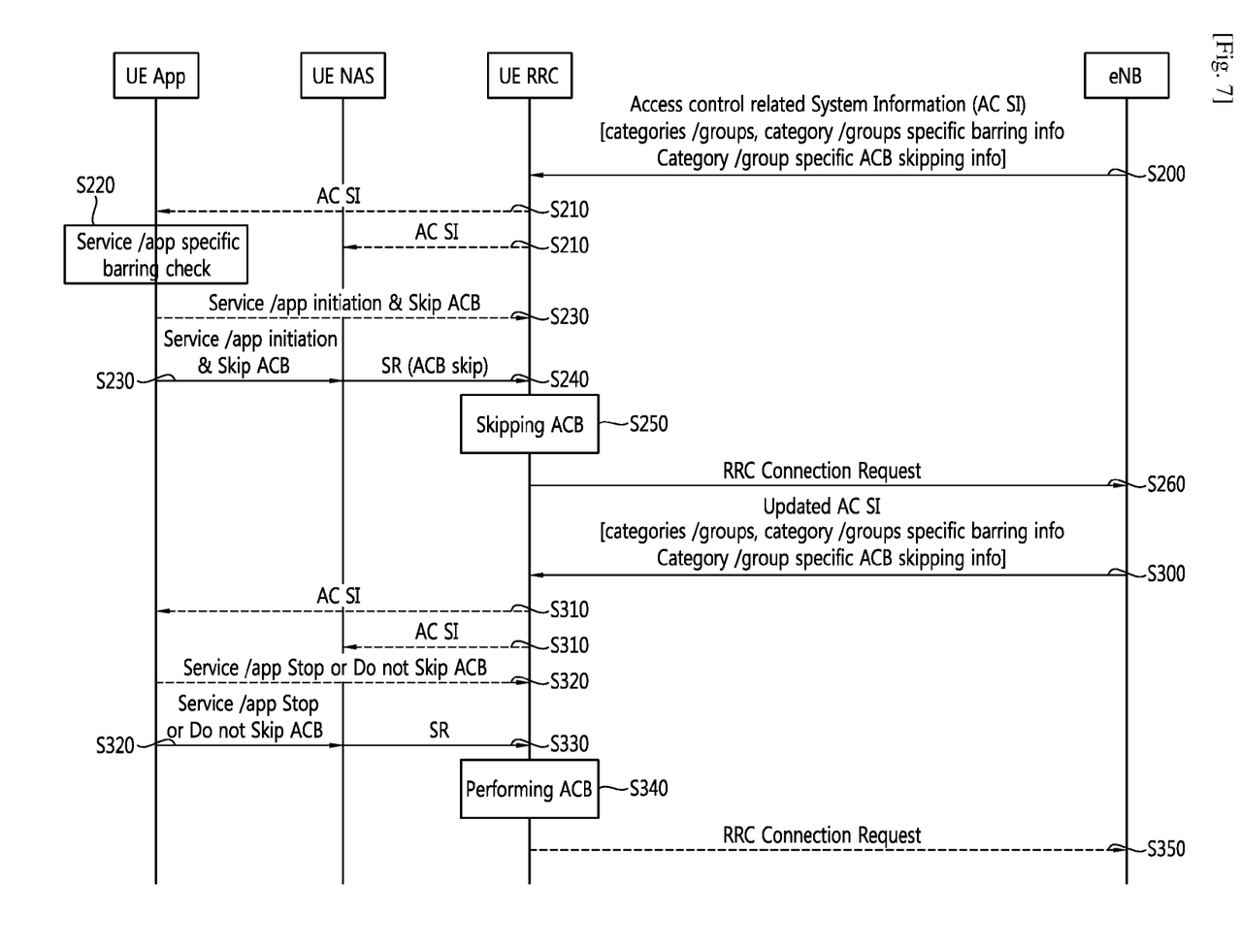
FIG. 7 shows an example of ACB skipping in a RRC connection establishment procedure according to an embodiment of the present invention.

FIG. 7 shows an example of ACB skipping in a RRC connection establishment procedure according to an embodiment of the present invention. In FIG. 7, IMS layer and MMTEL layer may be considered as the application layer of the UE.

In step S200, the RRC layer of the UE receives access control related system information (AC SI), e.g. in SIB2, from the eNB. The AC SI may contain at least one of followings.

Mapping between application (or service) and category (or group): The application/service may correspond to either a public safety application/service or a normal/commercial application/service (i.e. non-public safety application/service). The category/group may be a category/group configured for ACDC. The category/group may include one or more categories/groups of public safety applications/services. If there is one category/group of public safety applications/services, all public safety applications/services may belong to this category/group. Different groups of MCPTT call users (for public safety) may belong to either a single category/group or different categories/groups. Further, the category/group may include one or more categories/groups of non-public safety applications/services (i.e. normal/commercial application/services). If there is one category/group of non-public safety applications/services, all non-public safety applications/services may belong to this category/group.

Category/group specific barring information: The category/group specific barring information may include at least one of a barring factor or a barring time. The UE may determine whether or not to bar access attempts for this category/group by using the barring factor. If the UE determines to bar this access attempt, the UE may bar access attempts for this category/group for the barring time.

Category/group specific ACB skipping information: The category/group specific ACB skipping information may correspond to ACB skip bits indicating whether or not the UE needs to skip ACB barring check for initiation of application/service belonging to a specific category/group.

In step S210, the RRC layer of the UE forwards the received AC SI to the application layer (i.e. IMS layer, MMTEL layer) of the UE or the NAS layer of the UE, upon receiving the AC SI from the eNB, upon update of the AC SI from the eNB, or upon receiving request from the application layer (i.e. IMS layer, MMTEL layer) of the UE or the NAS layer of the UE.

The UE identifies initiation of a particular application/service, such as MO MCPTT voice, or MO public safety message. The UE may identify that the particular application/service belongs to a particular category/group, according to the AC SI or open mobile alliance (OMA) signaling. Thereafter, in step S220, the application layer of the UE performs barring check for the particular application/service. During barring check, the UE may draw a random number, compare the random number with the barring factor, and then determine whether or not to pass the barring check for the particular application/service, by checking whether or not the random number is lower than or higher than the barring factor. If the UE fails to pass the barring check, the UE postpones initiation of the particular application/service for the barring time. If the UE passes the barring check, the application layer of the UE may inform NAS/RRC layer of the UE about initiation of the particular application/service.

If the UE passes the barring check, in step S230, the application layer of the UE indicates to the RRC layer of the UE (or the NAS layer of the UE) that ACB check should be skipped, if ACB check should be skipped for the particular category/group according to the ACB skip bits. Further, the application layer of the UE indicates to the RRC layer of the UE (or the NAS layer of the UE) initiation of the particular application/service or the particular category/service.

If the UE passes the barring check, upon identifying initiation of the particular application/service, in step S240, the NAS layer of the UE transmits a service request (with establishment cause set to one of 'MO data', 'High Priority Access' or 'Emergency Access') to the RRC layer of the UE. For public safety application/service, the establishment cause may be set to 'Public Safety access'. For mission critical voice/video, the establishment cause may be set to 'Mission Critical voice/video'.

If the application layer of the UE indicates to the NAS of the UE that ACB check should be skipped, the NAS layer of the UE may always transmit the service request to the RRC layer of the UE (e.g. only for a particular establishment cause such as 'MO-data', 'High Priority Access' or 'Emergency Access'), regardless of indication of barring alleviation/applicability from the RRC layer of the UE. On the other hand, if the RRC layer of the UE previously indicates to the NAS layer of the UE that barring is applicable due to ACB check, and if the application layer of the UE indicates to the NAS layer of the UE that ACB check should not be skipped, the NAS layer of the UE may not transmit the service request to the RRC layer of the UE.

Alternatively, if ACB check should be skipped for the particular category/group according to the ACB skip bits, the NAS layer of the UE may transmit the service request to the RRC layer of the UE with indication of skipping ACB to the RRC layer of the UE for the particular application/service. Upon receiving the service request with the indication of skipping ACB, the RRC layer of the UE may initiate a RRC connection establishment procedure and skips ACB check in RRC connection establishment procedure. If ACB check should not be skipped for the particular category/group according to the ACB skip bits, the NAS layer of the UE may transmit the service request to the RRC layer of the UE without indication of skipping ACB for the particular application/service, in case that barring is not applicable in the RRC layer of the UE. Upon receiving the service request without the indication of skipping ACB, the RRC layer of the UE may initiate a RRC connection establishment procedure and perform ACB check in RRC connection establishment procedure.

Upon receiving the service request with indication of skipping ACB, in step S250, the RRC layer of the UE initiates a RRC connection establishment procedure and skips ACB check in the RRC connection establishment procedure. The RRC layer of the UE may skip ACB check whenever RRC connection establishment (only for establishment cause set to one of 'MO data', 'High Priority Access' or 'Emergency Access') is performed, until the application layer of the UE indicates to the RRC layer of the UE that ACB check should not be skipped. The RRC layer of the UE may perform ACB check when RRC connection establishment is performed for establishment cause set to a certain value (e.g. one of 'MT access' or 'Delay Tolerant Access'), even if the application layer of the UE indicates to the RRC layer of the UE (or the NAS layer of the UE) that ACB check should be skipped.

On one hand, if the UE is in RRC_IDLE and if the RRC layer of the UE determines skipping ACB check, the RRC layer of the UE may indicate to the MAC layer of the UE that the random access backoff is skipped. Then, while performing the random access procedure, the MAC layer of the UE may skip the random access backoff or set the value of backoff indicator to 'zero' (i.e. no backoff in the random access procedure). Then, if the RRC layer of the UE declares that RRC connection establishment is successfully completed, the RRC layer of the UE may indicate to the MAC layer of the UE that random access backoff is not skipped. Then, while performing the random access procedure, the MAC layer of the UE may not skip the random access backoff (i.e. if the eNB broadcasts the backoff indicator in the random access response, the backoff is applied in the random access procedure).

On the other hand, if the UE is in RRC_CONNECTED, upon receiving the service request, the RRC layer of the UE may indicate to the MAC layer of the UE that the random access backoff is skipped, instead of skipping ACB check. Then, while performing the random access procedure, the MAC layer of the UE may skip the random access backoff or set the value of backoff indicator to 'zero' (i.e. no backoff in the random access procedure). Then, if the RRC layer of the UE identifies that the service request is successfully transmitted, the RRC layer of the UE may indicate to the MAC layer of the UE that the random access backoff is not skipped. Then, while performing the random access procedure, the MAC layer of the UE may not skip the random access backoff (i.e. if the eNB broadcasts the backoff indicator in the random access response, the backoff is applied in the random access procedure).

In step S260, the RRC layer of the UE transmits the RRC connection request message after skipping ACB check.

In step S300, the RRC layer of the UE may receive updated system information with updated AC SI. The updated AC SI may contain at least one of information elements described in step S200.

In step S310, the RRC layer of the UE forwards the updated AC SI to the application layer (i.e. IMS layer, MMTEL layer) of the UE or the NAS layer of the UE.

The UE may identify stop of the particular application/service. If the ACB skip bits indicate that ACB check should not be skipped for the particular application/service, or if the particular application/service that has been initiated is stopped, upon identifying stop of the particular application/service, in step S320, the application layer of the UE indicates to the RRC layer of the UE (or the NAS layer of the UE) that ACB check should not be skipped, or the particular application/service stops or the particular category/group stops.

In step S330, the NAS layer of the UE transmits the service request to the RRC layer of the UE. If the application layer of the UE indicates to the NAS of the UE that ACB check should be skipped, the NAS layer of the UE may always transmit the service request to the RRC layer of the UE (e.g. only for a particular establishment cause such as 'MO-data', 'High Priority Access' or 'Emergency Access'), regardless of indication of barring alleviation/applicability from the RRC layer of the UE. On the other hand, if the RRC layer of the UE previously indicates to the NAS layer of the UE that barring is applicable due to ACB check, and if the application layer of the UE indicates to the NAS layer of the UE that ACB check should not be skipped, the NAS layer of the UE may not transmit the service request to the RRC layer of the UE.

Alternatively, if ACB check should be skipped for the particular category/group according to the ACB skip bits, the NAS layer of the UE may transmit the service request to the RRC layer of the UE with indication of skipping ACB to the RRC layer of the UE for the particular application/service. Upon receiving the service request with the indication of skipping ACB, the RRC layer of the UE may initiate a RRC connection establishment procedure and skips ACB check in RRC connection establishment procedure. If ACB check should not be skipped for the particular category/group according to the ACB skip bits, the NAS layer of the UE may transmit the service request to the RRC layer of the UE without indication of skipping ACB for the particular application/service, in case that barring is not applicable in the RRC layer of the UE. Upon receiving the service request without the indication of skipping ACB, the RRC layer of the UE may initiate a RRC connection establishment procedure and perform ACB check in RRC connection establishment procedure.

In step S340, if the UE is in RRC_IDLE, upon receiving the service request, the RRC layer of the UE initiates a RRC connection establishment procedure and performs ACB check in the RRC connection establishment procedure.

In step S350, if the ACB check passes, the RRC layer of the UE may transmit the RRC connection request message in the RRC connection establishment procedure.

Figure 8:
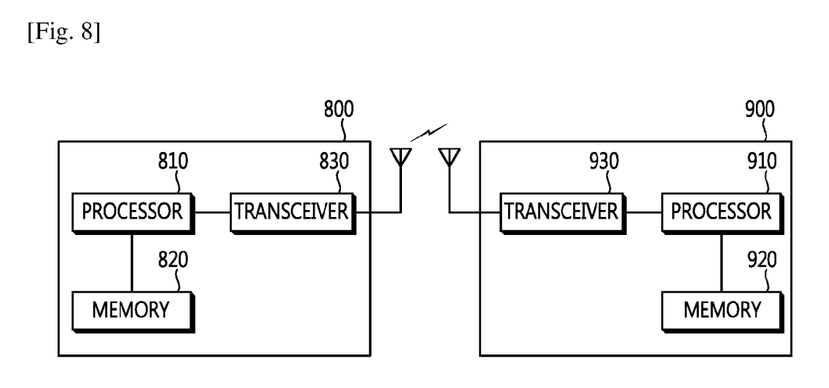
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the em-bodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), application specific access control in a wireless communication system, the method comprising:
   receiving, by a radio resource control (RRC) layer of the UE, access control related system information from a network,
   wherein the access control related system information indicates a barring time and a barring factor per each category, and
   wherein the access control related system information further indicates whether to skip an access control barring (ACB) check or whether to skip a random access backoff in a medium access control (MAC) layer of the UE;
   forwarding, from the RRC layer of the UE to a non-access stratum (NAS) layer of the UE, the access control related system information;
   identifying initiation of a specific application; and
   determining, by the NAS layer of the UE, whether or not to skip the ACB check for the specific application or to skip the random access backoff for the specific application based on the received access control related system information,
   wherein, if it is determined to skip the ACB check for the specific application or to skip the random access backoff for the specific application, the NAS layer of the UE transmits a service request to the RRC layer of the UE regardless of indication of a barring alleviation from the RRC layer of the UE,
   wherein the access control related system information includes mapping between at least one application and at least one category,
   wherein the at least one category is associated with at least one public safety application including a mission critical push to talk (MCPTT) application,
   wherein the at least one category is ranked in order of priority, and
   wherein the priority corresponds to one of a MCPTT priority, a per packet priority (PPP), a proximity services (ProSe) application priority, an allocation and retention priority, and a quality of service (QoS) class indicator (QCI).

2. The method of claim 1, wherein the at least one category is associated with at least one group communication.

3. The method of claim 1, wherein the at least one category corresponds to an application specific congestion control for data communication (ACDC) category.

4. The method of claim 1, wherein the priority of a category associated with a public safety application is higher than the priority of a category associated with a non-public safety application.

5. A user equipment (UE) comprising:
   a memory;
   a transceiver; and
   a processor coupled to the memory and the transceiver, and configured to:
      control the transceiver to receive, by a radio resource control (RRC) layer of the UE, access control related system information from a network,
      wherein the access control related system information indicates a barring time and a barring factor per each category, and
      wherein the access control related system information further indicates whether to skip an access control barring (ACB) check or whether to skip a random access backoff in a medium access control (MAC) layer of the UE,
      forward, from the RRC layer of the UE to a non-access stratum (NAS) layer of the UE, the access control related system information,
      identify initiation of a specific application, and
      determine by the NAS layer of the UE, whether or not to skip the ACB check for the specific application or to skip the random access backoff for the specific application based on the received access control related system information,
   wherein, if it is determined to skip the ACB check for the specific application or to skip the random access backoff for the specific application, the NAS layer of the UE transmits a service request to the RRC layer of the UE regardless of an indication of a barring alleviation from the RRC layer of the UE,
   wherein the access control related system information includes mapping between at least one application and at least one category,
   wherein the at least one category is associated with at least one public safety application including a mission critical push to talk (MCPTT) application,
   wherein the at least one category is ranked in order of priority, and
   wherein the priority corresponds to one of a MCPTT priority, a per packet priority (PPP), a proximity services (ProSe) application priority, an allocation and retention priority, and a quality of service (QoS) class indicator (QCI).

* * * * *